United States Patent
Thomas et al.

(10) Patent No.: US 8,086,195 B2
(45) Date of Patent: Dec. 27, 2011

(54) COMMUNICATION UNIT AND METHOD OF OPERATION THEREFOR

(75) Inventors: Howard J. Thomas, Cirencester (GB); Davood Molkdar, Eastleigh (GB); Steven J. Simpson, Swindon (GB)

(73) Assignee: Motorola Mobility, Inc., Libertyville, IL (US)

( * ) Notice: Subject to any disclaimer, the term of this patent is extended or adjusted under 35 U.S.C. 154(b) by 756 days.

(21) Appl. No.: 12/035,455

(22) Filed: Feb. 22, 2008

(65) Prior Publication Data

US 2009/0215418 A1     Aug. 27, 2009

(51) Int. Cl.
*H04B 7/08* (2006.01)
*H04B 1/06* (2006.01)
*H04B 7/00* (2006.01)
*H04M 1/00* (2006.01)

(52) U.S. Cl. ............ 455/132; 455/140; 455/277.1; 455/552.1; 375/347

(58) Field of Classification Search ........ 455/63.1–63.4, 455/65, 101, 552.1–553.1, 132–140, 272–280; 375/267, 346–347
See application file for complete search history.

(56) References Cited

U.S. PATENT DOCUMENTS

| | | | |
|---|---|---|---|
| 6,678,508 B1 * | 1/2004 | Koilpillai et al. | 455/137 |
| 7,072,628 B2 | 7/2006 | Agashe et al. | |
| 7,400,872 B2 * | 7/2008 | Kogure | 455/277.2 |
| 7,489,913 B2 * | 2/2009 | Welnick et al. | 455/140 |
| 7,555,031 B2 * | 6/2009 | Chan et al. | 375/136 |
| 7,606,164 B2 * | 10/2009 | Anandakumar et al. | 370/252 |
| 7,610,019 B2 * | 10/2009 | Moon et al. | 455/67.11 |
| 2004/0057530 A1 * | 3/2004 | Tarokh et al. | 375/267 |
| 2005/0032497 A1 * | 2/2005 | Girardeau et al. | 455/272 |
| 2005/0191978 A1 * | 9/2005 | Spencer et al. | 455/132 |
| 2005/0245207 A1 | 11/2005 | Suzuki et al. | |
| 2006/0056357 A1 * | 3/2006 | Payne et al. | 370/334 |
| 2006/0067445 A1 * | 3/2006 | Sadahiro | 375/347 |
| 2006/0089117 A1 * | 4/2006 | Suzuki | 455/269 |

(Continued)

FOREIGN PATENT DOCUMENTS

| | | |
|---|---|---|
| EP | 0740430 B1 | 11/2003 |
| WO | 0159945 A1 | 8/2001 |
| WO | 2005088864 A1 | 9/2005 |

OTHER PUBLICATIONS

3GPP TR 25.906 v1.0.0, 3rd Generation Partnership Project; Technical Specification Group RAN; Dynamically reconfiguring a FDD UE receiver to reduce power consumption when desired Quality of Service is met; (Release 7), 2006, pp. 1-22.

(Continued)

*Primary Examiner* — Simon Nguyen

(57) ABSTRACT

A communication unit for a radio communication system comprises a receiver for receiving data over an air interface. The receiver can operate in a first diversity mode and a second diversity mode. The first diversity mode may specifically correspond to no receive diversity being employed and the second diversity mode may correspond to signals from two or more fully or partially de-correlated antennas being combined. The communication unit comprises a data unit which determines a first data characteristic for a section of data to be received over the air interface. A switching unit is arranged to switch between the first diversity mode and the second diversity mode in response to the first data characteristic. The invention may allow improved performance and e.g. reduced power consumption by allowing an improved adaptation of diversity operation. In particular, an improved trade-off between power consumption and performance may be achieved in many embodiments.

16 Claims, 2 Drawing Sheets

U.S. PATENT DOCUMENTS

| | | | |
|---|---|---|---|
| 2006/0221894 A1 | 10/2006 | Casaccia et al. | |
| 2006/0293056 A1* | 12/2006 | Kim et al. | 455/442 |
| 2007/0167142 A1 | 7/2007 | Kim et al. | |
| 2009/0285322 A1* | 11/2009 | Imamura et al. | 375/267 |
| 2010/0210235 A1* | 8/2010 | Ulupinar et al. | 455/278.1 |
| 2010/0210321 A1* | 8/2010 | Tu et al. | 455/574 |

OTHER PUBLICATIONS

Sieben, Stefan: The International Search Report and the Written Opinion of the International Searching Authority, or the Declaration, European Patent Office, Rijswijk, completed Apr. 29, 2009, mailed May 11, 2009.

* cited by examiner

COMMUNICATION UNIT AND METHOD OF OPERATION THEREFOR

FIELD OF THE INVENTION

The invention relates to a communication unit and a method of operation therefor and in particular, but not exclusively, to use of receive diversity in a cellular communication system.

BACKGROUND OF THE INVENTION

In order to improve radio communications it has been proposed to use receive diversity wherein a number of fully or partially de-correlated signals received from the same source by different antennas are combined to provide a more reliable received signal.

The use of receive diversity is of increasing practical interest and is being introduced to more and more applications and is specifically being proposed to also be used in small portable battery powered communication units. For example, whereas the use of receive diversity has previously been limited to base stations of cellular communication systems, the intention is now to also provide some user equipments with multiple antennas in order to obtain receive diversity benefits. Specifically, 3GPP ($3^{rd}$ Generation Partnership Project) LTE (Long Term Evolution), 3GPP HSPA+ (High-Speed Packet Access) and 3GPP GERAN (GSM (Global System for Mobile communication) EDGE (Enhanced Data rates for GSM Evolution) Radio Access Network) Evolution include the use of receive diversity for the mobile stations.

However, a problem associated with the use of receive diversity is that the additional processing and functionality introduces additional computational demands and resource usage. In particular, the additional processing and functionality increases the power consumption and results in a reduced battery life for battery driven devices.

In order to address this problem, it has been proposed to switch receive diversity on or off depending on the experienced propagation conditions. Thus, receive diversity may be switched on if the propagation conditions deteriorate such that the receive quality of the received signal falls below a threshold. Similarly, if the propagation conditions improve during receive diversity operation, the diversity operation may be switched off when the receive quality exceeds a given threshold.

However, although such an approach may provide acceptable operation and reduce resource consumption in many scenarios, it tends to be suboptimal or insufficient in many cases. The approach may result in suboptimal usage of receive diversity thereby resulting in reduced receive quality and/or increased resource consumption.

Hence, an improved approach would be advantageous and in particular a system allowing increased flexibility, reduced resource usage, increased battery life, reduced power consumption, improved receive quality and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a communication unit for a radio communication system, the communication unit comprising: a receiver for receiving data over an air interface of the radio communication system, the receiver being operable to operate in at least a first diversity mode and a second diversity mode; a data unit for determining a first data characteristic for a section of data to be received over the air interface; and a switching unit for switching the receiver between the first diversity mode and the second diversity mode in response to the first data characteristic.

The invention may allow improved receive diversity operation for a communication unit. In particular, the invention may in many embodiments provide an improved trade-off between resource usage and receive quality/performance. Specifically, in many scenarios reduced power consumption can be achieved while maintaining acceptable receive quality thereby e.g. increasing battery life for portable communication devices, such as for user equipments for a cellular communication system.

The invention may allow the diversity operation to be adapted not only to the current propagation conditions but also to characteristics of the data being received over the air interface. Thus, by adapting the diversity operation to match the specific receive requirements for the specific data a reduced power consumption may be achieved. For example, the invention may allow receive diversity to be activated in response to a need to enhance signal quality for specific subsets of data that e.g. are especially sensitive to link quality degradations.

The first data characteristic reflects a characteristic of the data to be received in the data section, such as e.g. a characteristic of the channel data or channel information data, or a characteristic associated therewith such as a service or message which the data is part of. The first characteristic is thus a characteristic of the data being received rather than the propagation conditions. Specifically, the first data characteristic may be independent of the propagation conditions and/or characteristics of the air interface communication channel via which the data is received. The first data characteristic may be determined in advance of the data being received.

The first and second diversity modes have different diversity characteristics and may specifically correspond to a combination of a different number of received signals (from a different number of antennas). Specifically, one of the diversity modes may correspond to no receive diversity being used (i.e. processing of only one antenna signal) whereas the other diversity mode may include combination of two or more fully or partially de-correlated received antenna signals.

According to another aspect of the invention there is provided a method of operation for a communication unit of a radio communication system, the communication unit comprising a receiver for receiving data over an air interface of the radio communication system, the receiver being operable to operate in at least a first diversity mode and a second diversity mode; the method comprising: determining a first data characteristic for a section of data to be received over the air interface; and switching the receiver between the first diversity mode and the second diversity mode in response to the first data characteristic.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a user equipment for a cellular communication system such as a 3GPP LTE, 3GPP HSPA+ and/or 3GPP GERAN Evolution system. However, it will be appreciated that the invention is not limited to this application but may be applied in many other communication units and radio communication systems.

Figure 1:
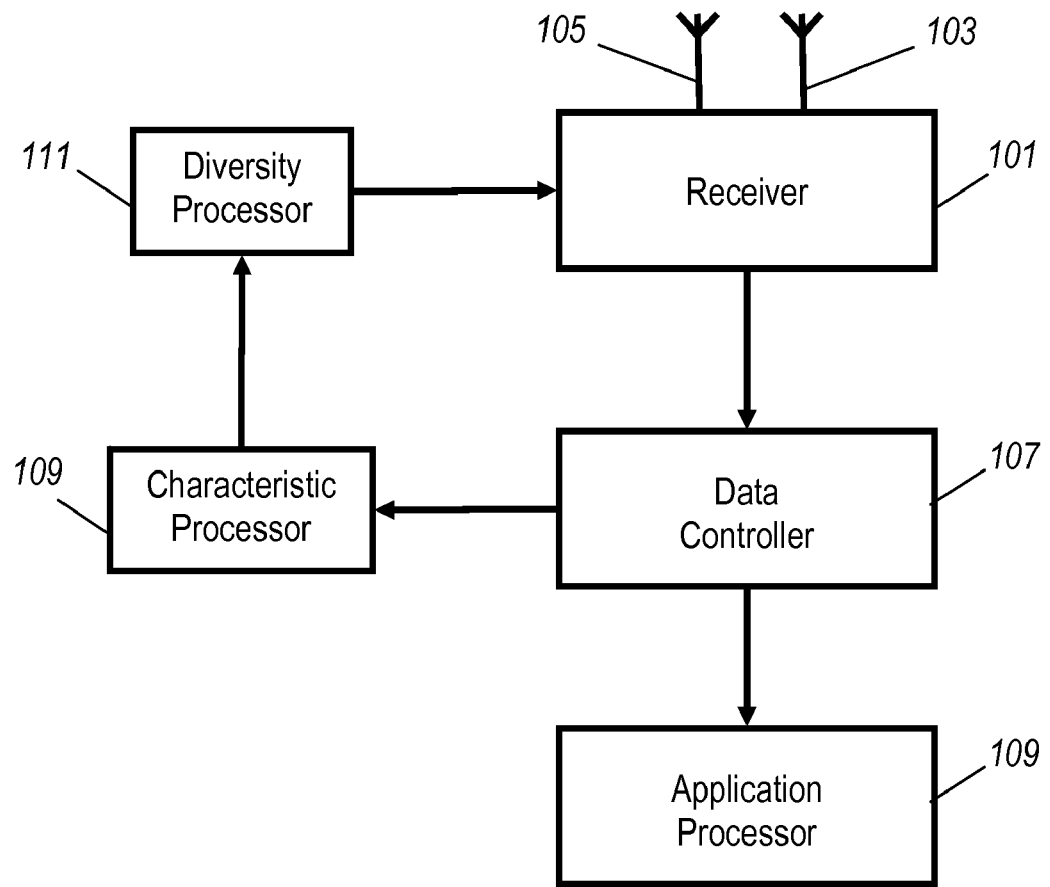
FIG. 1 illustrates an example of a communication unit in accordance with some embodiments of the invention.

FIG. 1 illustrates an example of a communication unit in accordance with some embodiments of the invention. In the specific example, the communication unit is a User Equipment 100 of a 3GPP cellular communication system but it will be appreciated that the described principles will be appropriate for any communication unit capable of receiving data over an air interface of a radio communication system.

The UE 100 comprises a receiver 101 which is arranged to receive data over the air interface of the 3GPP communication system. In particular, the receiver can receive user data and control data transmitted by a serving base station (not shown).

In the example, the UE 100 comprises two antennas 103, 105 coupled to the receiver 101. The two antennas 103, 105 are mounted such that radio signals received from the same source will tend to be partially or fully de-correlated. The receiver 101 is capable of operating in different diversity modes. In a first diversity mode, the receiver 101 does not use any receive diversity but simply receives the signal by processing the antenna signal from only one of the two antennas 103, 105. In a second diversity mode, the receiver 101 uses receive diversity and processes the antenna signals from both antennas 103, 105. Specifically, the signals from the two antennas 103, 105 are combined to improve the receive quality.

It will be appreciated that a number of different receive diversity techniques will be known to the skilled person and that any suitable receive diversity technique may be used in the second mode of operation. For example, the signals may be combined using switched diversity combining or by coherently adding the antenna signals. It will furthermore be appreciated that the combining of the signals may be performed in the Radio Frequency domain, an Intermediate Frequency (IF) domain or in the base band domain.

Also, it will be appreciated that in some embodiments, Multiple Transmit Multiple Receive (MTMR) or Multiple Input Multiple Output (MIMO) can be used in at least one of the diversity modes. Such techniques use multiple antennas at the transmitter and the receiver to improve the spectral efficiency. Specifically, the transmission techniques involve transmitting a data stream by simultaneously transmitting different signals derived from the data stream from different antennas over the same communication channel. The receiver(s) of these techniques typically also comprise a plurality of antennas each of which receive a combined signal corresponding to the transmitted signals modified by the individual propagation characteristics of the radio link between the individual antennas. The receiver may then retrieve the transmitted data stream by evaluating the received combined signal. The number of receive antennas may be varied between the diversity modes or that MIMO may only be used on one of the diversity modes.

It will be appreciated that as the non-diversity reception in the first mode of operation for the main example is substantially simpler than the diversity reception in the second mode of operation, the resource consumption and especially power consumption in the first diversity mode will tend to be substantially lower than in the second diversity mode. For example, in the first diversity mode circuitry, functionality and processes associated with the second antenna 103 and with receive diversity may be switched off. However, the receive performance will be reduced in the first diversity mode relative to the second diversity mode and the receive quality for identical signals will generally be higher in the second diversity mode than in the first diversity mode due to the diversity gain.

It will be appreciated that although the illustrated example focuses on an example wherein the receiver is capable of operating either in a diversity mode wherein no receive diversity is employed or in a diversity mode wherein diversity is employed, other diversity modes may be used in other embodiments. For example, in some embodiments, the first diversity mode can include using a simple low performing and low resource demanding diversity technique, such as switched combining, whereas the second diversity mode can include using a more complex, better performing and more resource demanding diversity technique, such as coherent combining (maximum likelihood combining).

It will be appreciated that although the example illustrates a communication unit having only two antennas, other embodiments may include a larger number of fully or partially de-correlated antennas. It will also be appreciated, that in some embodiments, more than two different diversity modes may be used by the communication unit.

The receiver 101 is coupled to a data controller 107 which receives the received data from the receiver 101. Specifically, the receiver 101 performs the functionality of the physical layer including down-conversion, filtering, amplification, demodulation, error correction decoding, de-interleaving, diversity combining (when in the second diversity mode) etc. The resulting data is then fed to the data controller 107 which proceeds to implement the next higher layers of the protocol.

In particular, the data controller 107 comprises the required functionality for determining the data messages and services that the individual received data belongs to. Thus, the data controller 107 can recreate the control messages and user data packets transmitted by the base station to the UE 100.

The data controller 107 is coupled to an application processor 109 which executes the relevant operations to provide the desired user service. For example, the application processor 107 can implement the control, service and application processes that are required or desired for providing a voice or data communication service to a user of the UE 101.

The data controller 107 is furthermore coupled to a characteristic processor 109. The characteristic processor 109 is arranged to determine a data characteristic for data of a section of data that is to be received over the air interface.

The data section may correspond to a specific message, data packet etc. In the following example, the characteristic processor 109 can divide each supported communication channel into a number of consecutive time intervals with each time interval e.g. corresponding to a time slot or a frame of the communication system. For example, in 3GPP a control or data channel may be divided into separate time slots wherein specific data is allocated to each time slot. The characteristic processor 109 may determine a data characteristic for each of these time slots. As a specific example, 3GPP LTE uses 10 msec frame structures and the characteristic processor 109 may determine a data characteristic for each 10 msec frame.

The characteristic processor 109 is coupled to a diversity processor 111 which is further coupled to the receiver 101.

The diversity processor 111 is arranged to control the diversity operation of the receiver 101 and specifically it can switch the receiver 101 between the first and second diversity modes in response to the data characteristic determined by the characteristic processor 109. In the example, for each time slot in which a data characteristic is determined, the diversity processor 111 selects which diversity mode to use for the time slot depending on the data characteristic for that time slot. Thus, in the example of a 3GPP LTE system, the diversity operation of the receiver 101 may be switched in 10 msec time intervals depending on the nature of the data being transmitted in the msec time interval. In some embodiments, the diversity operation may be switched in smaller intervals corresponding to sub-frame switching. For example, the diversity operation may be switching in 1 msec intervals depending on the nature of the data received in each of the 1 msec intervals.

The data characteristic determined by the characteristic processor 109 is a characteristic of the data that is to be received in the time slot for which the data characteristic is determined. The data characteristic is a characteristic of the data or information that is to be communicated in the time slot. However, the data characteristic is independent of the communication characteristics, i.e. it is independent of the current or expected propagation conditions, air interface communication channel characteristics, receive quality etc.

As an example, the data characteristic may comprise an indication that the data in the time slot is part of (including possibly being all of) a message belonging to a predetermined set of messages. For example, the characteristic processor 109 may comprise a list of specific data and/or control messages that are considered to be particularly critical for supporting the currently active communication services. Such messages may for example include control messages which are critical for maintaining communication (such as e.g. handover messages), control messages for setting up new communication services (such as e.g. paging messages) or elements of user data considered to be particularly critical. For each time slot the characteristic processor 109 may then determine whether the time slot comprises data which belongs to one of these predetermined messages or not.

In a low complexity embodiment, the diversity processor 111 may simply switch the receiver 101 to the second diversity mode (i.e. using diversity combining of signals from both antennas 103, 105) for time slots wherein the data characteristic indicates that data belongs to one of the predetermined messages and may switch the receiver 101 to the first diversity mode (i.e. no receive diversity) otherwise.

However, in a more complex embodiment, the criterion for switching between the first and second diversity modes may not only depend on the data characteristic meeting a fixed predetermined criterion. Rather, the criterion may be a dynamic criterion that depends on other characteristics and properties. Specifically, the criterion used to determine which diversity mode to use may in addition to the data characteristic also take into account receive quality and/or propagation characteristics.

For example, the criterion for switching to the first diversity mode may comprise a requirement that the receive quality is above a first threshold if the data of the time slot belongs to one of the predetermined messages, and above a second lower threshold if the data of the time slot does not belong to one of these messages. Similarly, the criterion for switching to the second diversity mode of operation may comprise a requirement that the receive quality is below a third threshold if the data of the time slot belongs to one of the predetermined messages and below a fourth higher threshold if the data of the time slot does not belong to one of these messages. Such an approach allows diversity operation to be selectively used to provide a higher receive reliability for critical messages than for non-critical messages. Thus, the power consumption can be substantially reduced while still maintaining a high likelihood of a high quality of service.

The UE 100 of FIG. 1 is arranged to activate receive diversity in response to a need to enhance the signal quality for specific subsets of data that are considered especially sensitive to link quality or are particularly critical for correct operation. The approach allows the diversity operation of the UE 100 to be controlled not only in response to the propagation conditions and fluctuating quality of the received signal but also depending on the nature and the structure of the data that is actually being sent to the UE 100. Thus, not only are the characteristics and properties of the transmission to the UE 100 taken into account but the actual nature of the communicated information is also considered.

The UE 100 specifically pre-determines a potential need to engage receive diversity for an upcoming data section and selects the receive diversity operation in response to this pre-determined need as well as the estimated radio channel conditions. The pre-determination of the need is reflected in the data characteristic and is based on known characteristics of the data to be received in the specific section. Such an approach may provide improved operation and may in particular provide improved trade-off between receive quality/performance and power consumption by adapting the diversity operation to not only reflect radio channel conditions but also characteristics associated with the information being received.

In the following a number of different characteristics and criteria for selectively switching diversity modes depending on characteristics of the data that is to be received will be described.

In some embodiments, the data characteristic comprises an indication of a type of data comprised in the section of data. For example, the data characteristic can comprise an indication of whether the section of data comprises control data or non-control data.

In many communication systems the successful receipt of control data is essential to maintain a communication link that can support user data communications. Therefore, the successful receipt of control data is often critical, whereas errors in the user data may be acceptable for many communication services. For example, for a video or audio streaming communication service, errors in the received user data may nearly result in an acceptable temporary quality degradation whereas errors in the received control data may potentially result in the communication link itself being terminated. Accordingly, the diversity processor 111 can in some embodiments switch between diversity modes depending on whether the receive data is control data or user data. For example, for a communication channel quality below a first threshold the diversity processor 111 may employ receive diversity to both control data and user data, for a communication channel quality above a second threshold the diversity processor 111 may not use receive diversity for either control data or user data, and for a communication channel quality between the two thresholds the diversity processor 111 may employ receive diversity for control data but not user data.

It will be appreciated that the decision as to which diversity mode to use may further consider the type of control data being transmitted and/or the type of user data being transmitted.

For example, the introduction of receive diversity may be limited to control data considered to be of particular importance and/or relevance. Specifically, as previously described, the increased bias towards using receive diversity may only be applied to data belonging to a predetermined set of control messages.

The data characteristic can specifically comprise an indication of the data in the time slot being handover data. For example, the diversity processor 111 may comprise a list of handover messages and whenever the data characteristic indicates that the data to be received is part of such a handover message, it may control the receiver 101 to employ receive diversity thereby increasing the probability of a successful reception of the handover message.

Thus, the UE 100 can increase the receive sensitivity during handover/reselection to help ensure correct reception of handover commands. This may substantially increase the probability of the communication service being supported across a cell boundary while maintaining a low power consumption of the UE 100.

The characteristic processor 109 may determine that the data to be received is part of a control message in response to prior information, such as known scheduling information for the handover message. However, in some embodiments, the characteristic processor 109 may alternatively or additionally determine the data characteristic in response to already received data of a control message.

For example, a handover control command/message may be distributed over a plurality of time slots and based on the data of one or more early time slots of this message, the characteristic processor 109 may identify that the message is indeed a handover control message. Accordingly it may set the data characteristic for the remaining time slots to indicate that the data of these time slots is handover control data.

In some embodiments, the data characteristic may comprise an indication that the data of the time slot is retransmission data.

Some communication services may use a retransmission protocol wherein data packets that are correctly received are acknowledged by the UE 100 whereas data packets received in error (or not received) are not acknowledged by the UE 100. The base station then retransmits any non-acknowledged data packets. In such a system, the diversity processor 111 may for example switch the receiver 101 to always use receive diversity (i.e. the second diversity mode) when receiving retransmission data. This may increase the probability of correctly receiving the retransmission data thereby reducing delays caused by multiple retransmissions of the same data packet. Furthermore, the approach allows the receive diversity to be targeted at data which is experiencing challenging propagation conditions. Furthermore, as retransmissions occur relatively infrequently the power consumption of the receiver 101 may be maintained at a low level.

In some embodiments, the data characteristic can comprise an indication of the relation of the data in the time slot to other data. Specifically, the data characteristic can indicate the data of the time slots relation to other data of a data block of which the data is a part of.

For example, the UE 100 may receive a block of data from the base station, such as e.g. when a file is being downloaded to the UE 100. The data characteristic may in such a case comprise an indication of the amount of data of the data block that has been received prior to the time slot (or equivalently how much data remains of the data block). The use of receive diversity may accordingly be determined in response to how close the data block is to being fully received.

For example, the diversity processor 111 may gradually decrease the required receive quality threshold for switching on the receive diversity as the download of the data block progresses thereby increasing the reliability of the received data and reducing the risk of the download failing. Thus, the trade-off between the receive quality and power consumption may continuously be adapted to reflect the increasing impact of the download being terminated due to receive errors.

In some embodiments, the data characteristic may comprise an indication of the error sensitivity for the data. Specifically, the impact of receive errors is different for different data messages. For example, for some messages, a receive error may result in the communication being terminated, for others it may result in increased delay (e.g. due to retransmissions) whereas for other services receive errors may be acceptable as they may only result in a temporary and acceptable quality degradation (e.g. a low quality video streaming service).

Accordingly, the data characteristic may include an indication of the error criticality of the specific data message that the data of the time slot belongs to. This may then be taken into account by the diversity processor 111 when determining whether to use the first or second diversity mode. For example, for non-sensitive data messages the first diversity mode may always be employed, for critical data messages the second diversity mode may always be employed and for sensitive but non-critical data messages the selection between the first and second diversity mode may be dependent on the current propagation channel conditions.

It will be appreciated, that the error sensitivity may not necessarily relate to a sensitivity of the data message or data service as such but may additionally or alternatively relate to individual data bits. For example, many speech encoding algorithms generate speech data with some data bits being highly critical for recreating perceptible speech whereas other data bits are less important and merely improve the perceived speech quality. When receiving voice data, the data characteristic may accordingly indicate which group the data of the time slot belongs to. For example, the diversity processor 111 may always switch on receive diversity for critical speech data.

In some embodiments, the data characteristic comprises an indication of an error protection characteristic for the data of the data section. For example, some data may be transmitted with high levels of error correction coding and may therefore be less sensitive to receive errors within a single time slot than data transmitted with lower levels of error correction coding. Accordingly, the diversity processor 111 may determine whether to use the first or second diversity mode depending on the amount of error correction coding that has been applied to the data being received in the time slot.

As another example, error protection may include interleaving wherein error correction coding data is distributed over a number of time slots in order to provide time diversity. In such cases the spatial diversity may be less beneficial and the diversity processor 111 may bias the diversity mode decision towards the first diversity mode.

In some embodiments the data characteristic may be determined in response to a user input. For example, the user may manually identify that a given communication service is considered to be of high priority. In response, the data characteristic of all time slots including data of the identified communication service can indicate that the data is high priority data. Accordingly, the diversity processor 111 may switch on receive diversity for such time slots.

As another example, a user may manually request the retransmission of specific data. For example, the user may currently be receiving an audio stream and may request a section of this audio stream to be retransmitted if the initial receive quality resulted in an audio quality that was unacceptable to the user. In such a case, the data characteristic of all time slots comprising data of the retransmission may be set to indicate that the data is of high priority resulting in the use of the second diversity mode. Thus, the receive diversity mode may be selected in response to a user asking for repetition of a message with improved quality.

In some embodiments, the diversity processor 111 is arranged to switch between the first and second diversity modes in response to an average receive quality characteristic for data received over the air interface.

For example, the diversity processor 111 may alternate between the first and second diversity modes with a duty cycle that achieves a desired average receive bit error rate. For example, the bit error rate in the first diversity mode may be higher than the desired average bit error rate whereas the bit error rate in the second diversity mode is lower than necessary. The duty cycle may accordingly be adjusted such that the average bit error rate meets the target error rate. Thus, if the measured average bit error rate exceeds the target average bit error rate, the duration of the first diversity mode is reduced. Similarly, if the measured average bit error rate is below the target average bit error rate (e.g. by a suitable margin), the duration of the first diversity mode is increased.

In the previous description, a data characteristic and diversity mode was determined for each time slot. In some embodiments, the selection of a diversity mode may be made for data sections that are not necessarily identical to a single time slot. For example, a possible diversity mode switch time can be determined in response to a characteristic of the data that is being received and/or in response to scheduling data.

For example, an asynchronous approach may be applied wherein the data for different data messages is time divided onto a common carrier (although the boundaries between different data messages typically are aligned with time slot boundaries, not every time slot boundary is necessarily associated with a boundary between data messages).

Thus, in such an embodiment at least one of a start time and an end time for the section of data for which the receive mode is selected can be determined in response to a data characteristic of the data received over the air interface. Specifically, the start and end time may be determined as the boundaries for a transmission of data associated with a single data message. The data characteristic used to determine the start and end time may be the same data characteristic that is used to select the diversity mode or may be a different characteristic.

As a specific example, the start time and/or end time for the section of data may be determined in response to a scheduling characteristic for data over the air interface. Thus, the UE 100 may be aware of when specific data messages are scheduled and may accordingly set the diversity mode decision interval to reflect the scheduling. For example, for a shared control channel, the UE 100 may be provided with information that indicates when individual control messages for the UE 100 will be transmitted. Accordingly, it may set the diversity mode decision interval such that it coincides with these control message intervals.

It will further be appreciated that in some embodiments the data characteristic used to select the diversity mode is determined in response to a scheduling characteristic for data over the air interface.

For example, the type of data which is received in a specific time interval may be determined from scheduling information indicating the data that has been scheduled for the time interval.

For example, the scheduling information may include an indication of when data belonging to a specific set of predetermined data messages are transmitted. The predetermined data messages may correspond to the data messages that are considered of high importance. Accordingly whenever the scheduling information indicates that data of such a message will be (or may be) transmitted, the data characteristic is set to indicate a high priority for this time interval and accordingly the diversity processor 111 controls the receiver 101 to operate in the second diversity mode.

It will be appreciated that the scheduling information may be dynamic scheduling information transmitted to the UE 100 from the base station or may e.g. be static or semi-static scheduling information. For example, the Technical Specifications and Standards for a given communication system may comprise a definition of when individual control data is transmitted on the control channels. This definition can accordingly be used by the UE 100 to generate a data characteristic that reflects when data of specific data messages will be (or may be) received.

It will also be appreciated that the data characteristic may not necessarily reflect data that is being transmitted in the time interval but may reflect data that may potentially be transmitted within the time interval.

For example, the time interval may correspond to a time interval allocated to transmission of paging messages to the UE 100. Thus, the characteristic processor 109 may generate a data characteristic which indicates e.g. a start time and an end time for a time interval allocated to transmission of paging messages to the UE 100. In response to receiving this data characteristic, the diversity processor 111 may accordingly proceed to switch the receiver 101 into the second receive mode at the start time of this interval in order to increase the likelihood that any transmitted paging messages will be correctly received by the UE 100. In the example, the diversity processor 111 may furthermore switch the receiver back to the first diversity mode at the end of the time interval in order to reduce the power consumption. Thus, an improved paging operation and reliability can be achieved without a substantial increase in the power consumption.

Figure 2:
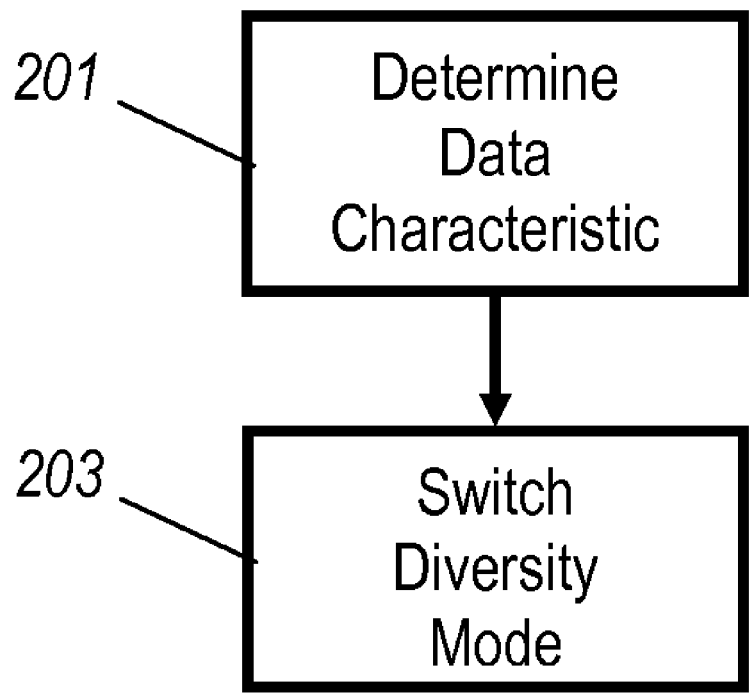
FIG. 2 illustrates a method of operation for a communication unit of a radio communication system in accordance with some embodiments of the invention.

FIG. 2 illustrates a method of operation for a communication unit of a radio communication system in accordance with some embodiments of the invention. The communication unit comprises a receiver for receiving data over an air interface of the radio communication system. The receiver is operable to operate in at least a first diversity mode and a second diversity mode. The method may specifically be applied to the UE 100 of FIG. 1.

The method initiates in step 201 wherein a first data characteristic is determined for a section of data to be received over the air interface.

Step 201 is followed by step 203 wherein the communication unit switches the receiver between the first diversity mode and the second diversity mode in response to the first data characteristic.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A communication unit for a radio communication system, the communication unit comprising:
   a receiver for receiving data over an air interface of the radio communication system, the receiver being operable to operate in at least a first diversity mode and a second diversity mode;
   a data unit for determining a first data characteristic for a section of data to be received over the air interface, the first data characteristic representing one of a type of message in the section of data and a type of data in the section of data; and
   a switching unit for switching the receiver between the first diversity mode and the second diversity mode in response to the first data characteristic.

2. The communication unit of claim 1 wherein the receiver is arranged not to use receive diversity in the first diversity mode and to use receive diversity in the second diversity mode.

3. The communication unit of claim 1 wherein the receiver is arranged to switch the receiver from the first diversity mode to the second diversity mode for a time interval corresponding to the section of data in response to the first data characteristic meeting a criterion.

4. The communication unit of claim 3 wherein the receiver is arranged to switch the receiver from the second diversity mode to the first diversity mode at an end time of the time interval.

5. The communication unit of claim 3 wherein the criterion comprises a requirement that the first data characteristic is indicative of the type of message belonging to a predetermined set of messages.

6. The communication unit of claim 3 wherein the criterion comprises a requirement that the first data characteristic is indicative of the type of data being retransmission data.

7. The communication unit of claim 1 wherein the type of data comprises an indication of whether the section of data comprises control data or non-control data.

8. The communication unit of claim 1 wherein the type of data comprises an indication of whether the section of data comprises handover data.

9. The communication unit of claim 1 wherein the receiver is arranged to determine the first data characteristic in response to a user input.

10. The communication unit of claim 9 wherein the first data characteristic comprises an indication of the data of the data section comprising data of a user requested retransmission.

11. The communication unit of claim 1 further arranged to determine at least one of a start time and an end time for the section of data in response to a second data characteristic of the data received over the air interface.

12. The communication unit of claim 1 further arranged to determine the first data characteristic in response to a scheduling characteristic for data over the air interface.

13. The communication unit of claim 12 wherein the scheduling characteristic comprises an indication of a transmission time for data of a data message of a predetermined set of data messages.

14. The communication unit of claim 1 wherein the switching unit is further arranged to switch between the first and second diversity mode in response to an average receive quality characteristic for data received over the air interface.

15. The communication unit of claim 1 wherein the data of the section of data is part of a data message, and the data unit is arranged to determine the first data characteristic in response to data of the data message received prior to the section of data.

16. A method of operation for a communication unit of a radio communication system, the communication unit comprising a receiver for receiving data over an air interface of the radio communication system, the receiver being operable to operate in at least a first diversity mode and a second diversity mode; the method comprising:
   determining a first data characteristic for a section of data to be received over the air interface, the first data characteristic representing one of a type of message in the section of data and a type of data in the section of data; and
   switching the receiver between the first diversity mode and the second diversity mode in response to the first data characteristic.

* * * * *